United States Patent
Lee

[19]

[11] Patent Number: 6,097,601
[45] Date of Patent: Aug. 1, 2000

[54] RETENTION MECHANISM FOR HEAT SINK

[75] Inventor: Richard Lee, Taipei, Taiwan

[73] Assignee: Foxconn Precision Components Co., Ltd., Taipei Hsien, Taiwan

[21] Appl. No.: 09/418,635

[22] Filed: Oct. 15, 1999

[30] Foreign Application Priority Data

May 15, 1999 [TW] Taiwan ................................. 88207780

[51] Int. Cl.⁷ ...................................................... H05K 7/20
[52] U.S. Cl. .......................... 361/704; 361/695; 361/707; 361/710; 361/717; 257/706; 257/707; 257/713; 174/16.1; 174/16.3; 165/80.3; 165/122; 165/185
[58] Field of Search .................................. 361/687, 695, 361/700–714, 719, 715, 718, 720; 257/706–727; 165/80.3, 80.4, 122, 185; 174/16.3, 16.1; 439/177.06, 71, 70, 124

[56] References Cited

U.S. PATENT DOCUMENTS

| | | | |
|---|---|---|---|
| 5,662,163 | 9/1997 | Mira | 165/80.3 |
| 5,943,210 | 8/1999 | Lee | 361/697 |
| 5,973,921 | 10/1999 | Lin | 361/695 |
| 5,982,622 | 11/1999 | Chiou | 361/704 |
| 6,008,990 | 12/1999 | Liu | 361/704 |

FOREIGN PATENT DOCUMENTS 409082859A  3/1997  Japan ............................. H01L 23/40

Primary Examiner—Leo P. Picard
Assistant Examiner—Michael Datskovsky
Attorney, Agent, or Firm—Wei Te Chung

[57] ABSTRACT

A retention mechanism for securely engaging a heat sink with a CPU module comprises a base plate and a guiding member. The base plate has a H-shaped main body and two pairs of mounting legs upwardly extending from corners thereof for engaging with a CPU module and a heat sink. Each mounting leg forms a resilient tip on a free end thereof and a pair of cutouts proximate the resilient tip. The guiding member forms a shaft and a pair of latching arms outwardly extending from opposite ends of the shaft. A pair of elongate engaging slots is defined in each latching arm corresponding to the mounting legs. A receiving aperture is defined in communication with each engaging slot for insertion of the tip of the corresponding mounting leg therethrough. A pair of engaging tabs is formed on opposite sides of each engaging slot for engaging with the corresponding cutouts of the mounting legs.

11 Claims, 3 Drawing Sheets

RETENTION MECHANISM FOR HEAT SINK

BACKGROUND OF THE INVENTION

The present invention relates to a retention mechanism of a heat sink, and particularly to a retention mechanism for easily securing a heat sink to a central processing unit (CPU) module.

As the operational speed of a CPU increases, a large quantity of heat is produced. The heat may surpass a maximum temperature limit of the CPU and adversely affect normal operation thereof if the heat generated thereof is not effectively dissipated. Therefore, a heat sink is commonly fixed to the CPU for dissipating accumulated heat. Furthermore, a retention mechanism is usually used to firmly secure the heat sink to the CPU for achieving excellent heat dissipation.

A conventional retention mechanism for a heat sink is disclosed in U.S. Pat. No. 5,805,430. A frame in accordance with the conventional retention mechanism is mounted to a support on which a substrate is mounted. The substrate is a printed circuit board, a circuit card, or other similar device. The frame is positioned on the support and comprises a plate above the substrate for supporting a heat sink and several studs surrounding the substrate for securing the frame to the support. The plate defines an aperture through which the heat sink is connected with the substrate. However, the frame is too bulky and occupies too much space on the support. If the support is a mother board, such a retention mechanism can not fulfil practical and economical requirements.

Another kind of the retention mechanism for a heat sink is shown in FIGS. 1 and 2. A CPU module 3 is vertically mounted on a circuit board (not labeled), while a heat sink 2 is also vertically mounted on the circuit board proximate the CPU module 3. A retention mechanism 1 is provided to secure the heat sink 2 to the CPU module 3. The retention mechanism 1 comprises a contracting plate 10 attached to the CPU module 3 and a plurality of mounting legs 60. The mounting legs 60 are pre-fixed to the heat sink 2 and outwardly extend therefrom for extending through corresponding apertures (not shown) defined in the CPU module 3. The contracting plate 10 comprises a handle 11 formed on a bottom edge thereof proximate the circuit board for facilitating manual operation, and a plurality of resilient portions 12 outwardly extending at an incline for resiliently cooperating with the corresponding mounting legs 60. An elongate slot (not shown) is defined in each resilient portion 12 for engaging with the corresponding mounting leg 60. The apertures extends through the contracting plate 10 and communicate with the corresponding elongate slots of the resilient portions 12.

The mounting legs 60 are fixed to the heat sink 2 firstly in assembly. The handle 11 is then upwardly moved to drive the contracting plate 10 upwards thereby permitting the mounting legs 60 to extend through the corresponding apertures and out of the corresponding elongate slots of the contracting plate 10. After the extensions of the mounting legs 60, the handle 11 is released to secure the mounting legs 60 with the contracting plate 10 via the corresponding resilient portions 12.

However, since space on the circuit board is limited, vertical operation of the handle 11 is adversely limited by other electronic elements 5, such as a capacitor. Furthermore, the pre-loaded mounting legs 60 outwardly extend from the heat sink 2 through the CPU module 3 to cooperate with the corresponding resilient portions 12 of the contracting plate 10. Thus, an assembly of the heat sink 2, the CPU module 3 and the retention mechanism 1 is bulky and occupies a large space on the circuit board. Moreover, the assembly is inconvenient for package and transportation. In addition, preloading the mounting legs 60 onto the heat sink 2 is laborious since a convection region 6 of the heat sink 2 has a large quantity of high density heat dissipating plates (not labeled), thereby increasing manufacturing costs.

BRIEF SUMMARY OF THE INVENTION

A main object of the present invention is to provide a retention mechanism for securing a heat sink to a central processing unit (CPU) to form an assembly of the heat sink, the CPU module and the retention mechanism in with a minimal volume thereby facilitating package and transportation.

Another object of the present invention is to provide a retention mechanism which can be conveniently operated to securely engage a heat sink with a CPU module without being adversely affected by other electronic elements mounted on a circuit board adjacent to the CPU module.

A retention mechanism in accordance with the present invention is stamped and formed from a metal sheet, and comprises a base plate and a guiding member. The base plate has a H-shaped main body and two pairs of mounting legs upwardly extending from corners of the main body for engaging with a CPU module and a heat sink. Each mounting leg forms a resilient tip on a free end thereof and a pair of cutouts proximate the resilient tip. The guiding member forms a shaft and a pair of latching arms outwardly extending from opposite ends of the shaft. A pair of elongate engaging slots is defined in each latching arm corresponding to the mounting legs. A receiving aperture is defined in communication with each engaging slot for insertion of the tip of the corresponding mounting leg therethrough. A pair of engaging tabs is formed on opposite sides of each engaging slot for engaging with the corresponding cutouts of the mounting legs.

In assembly, the mounting legs of the base plate are inserted through corresponding apertures and holes defined in the CPU module and the heat sink, while the guiding member is disposed on the heat sink with the engaging slots aligning with the corresponding holes of the heat sink. The tips of the mounting legs outwardly extend from the corresponding engaging slots. The guiding member is then moved to allowing the free distals of the mounting legs to slide along the corresponding elongate engaging slots until the cutouts of the mounting legs engage with the corresponding tabs of the guiding member.

Other objects, advantages and novel features of the invention will become more apparent from the following detailed description when taken in conjunction with the accompanying drawings.

DETAILED DESCRIPTION OF THE INVENTION

Figure 1:
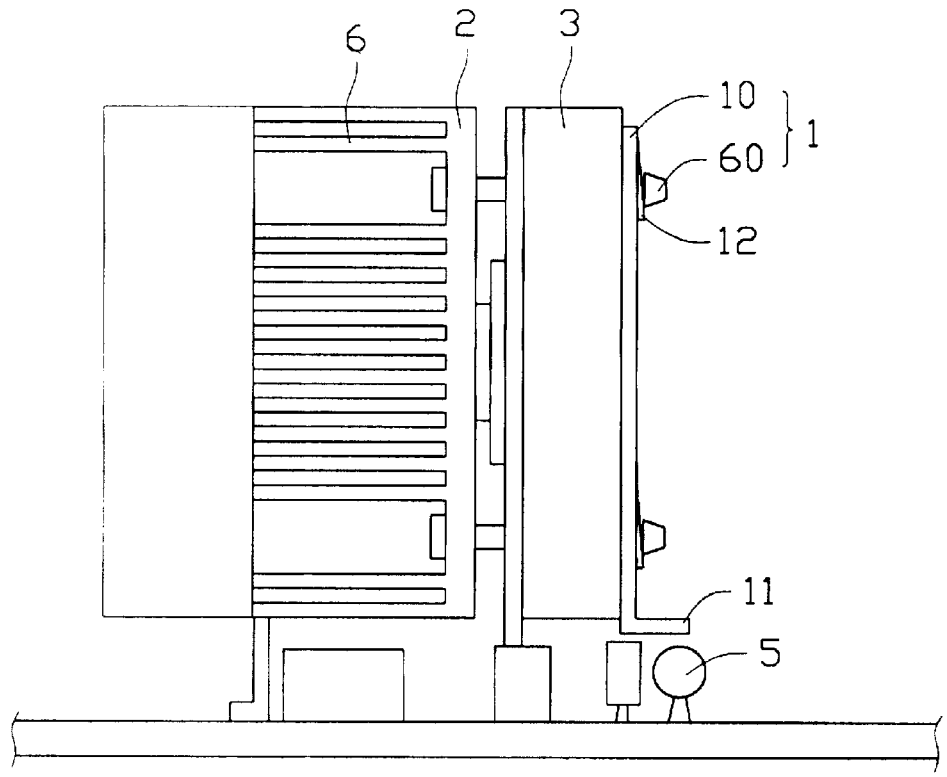
FIG. 1 is a side assembled view of a conventional retention mechanism, a heat sink and a CPU module mounted on a PCB.
Figure 2:
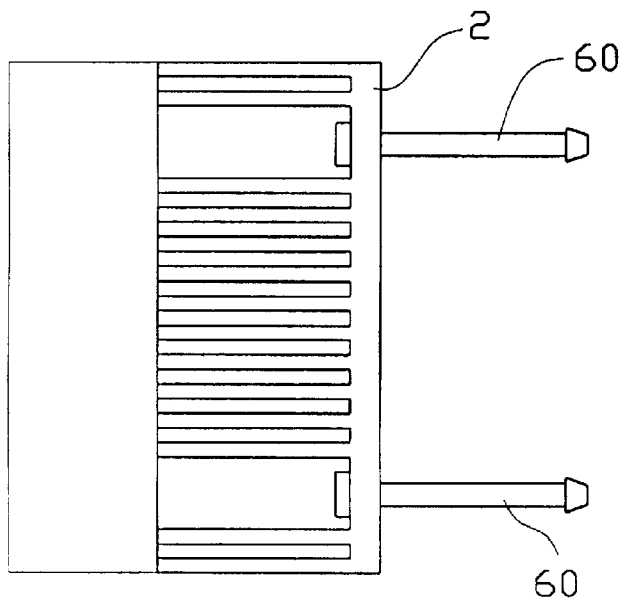
FIG. 2 is a side view of the retention mechanism and the heat sink of FIG. 1.
Figure 3:
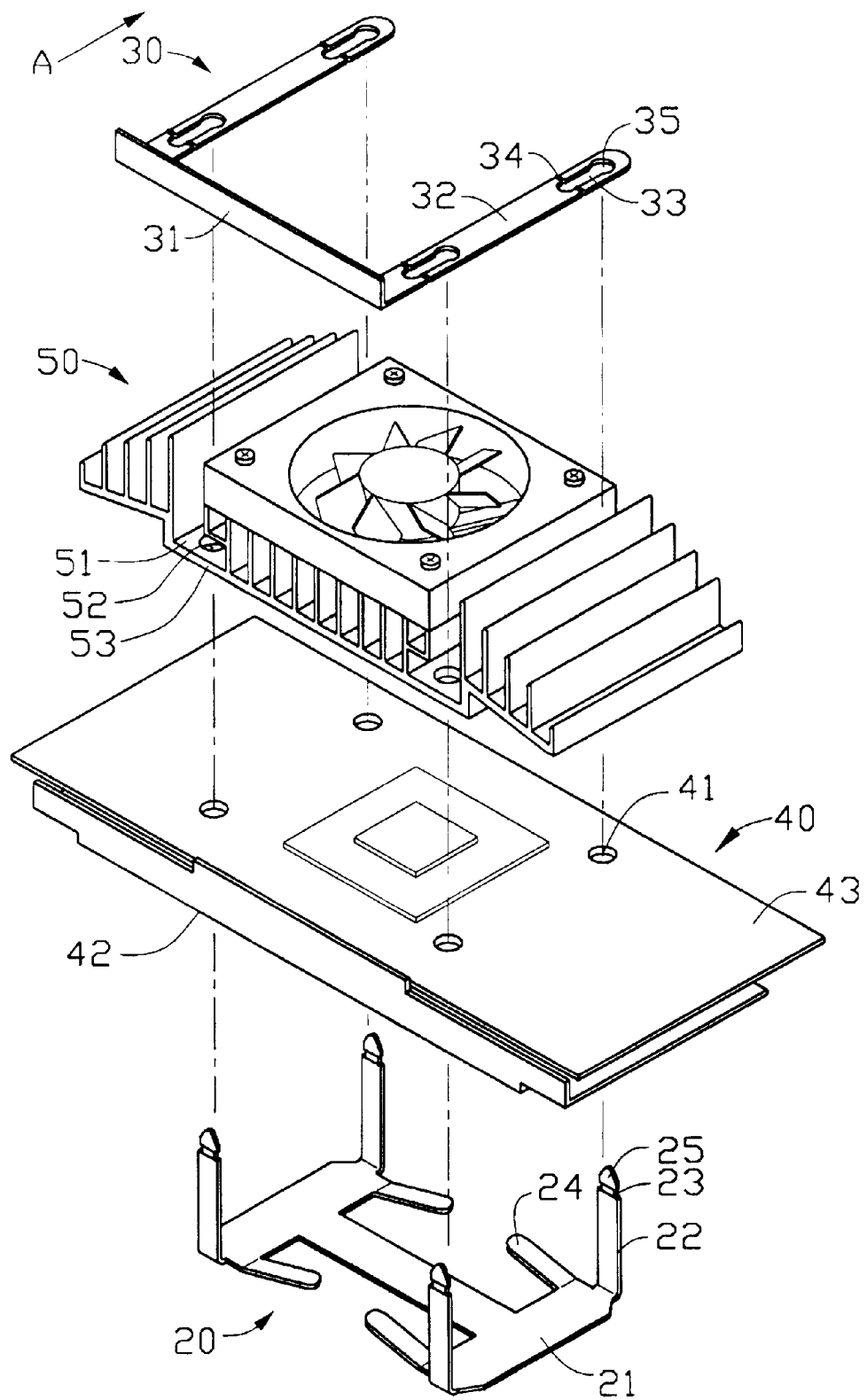
FIG. 3 is an exploded view of a heat sink, a CPU module and a retention mechanism of the present invention.
Figure 4:
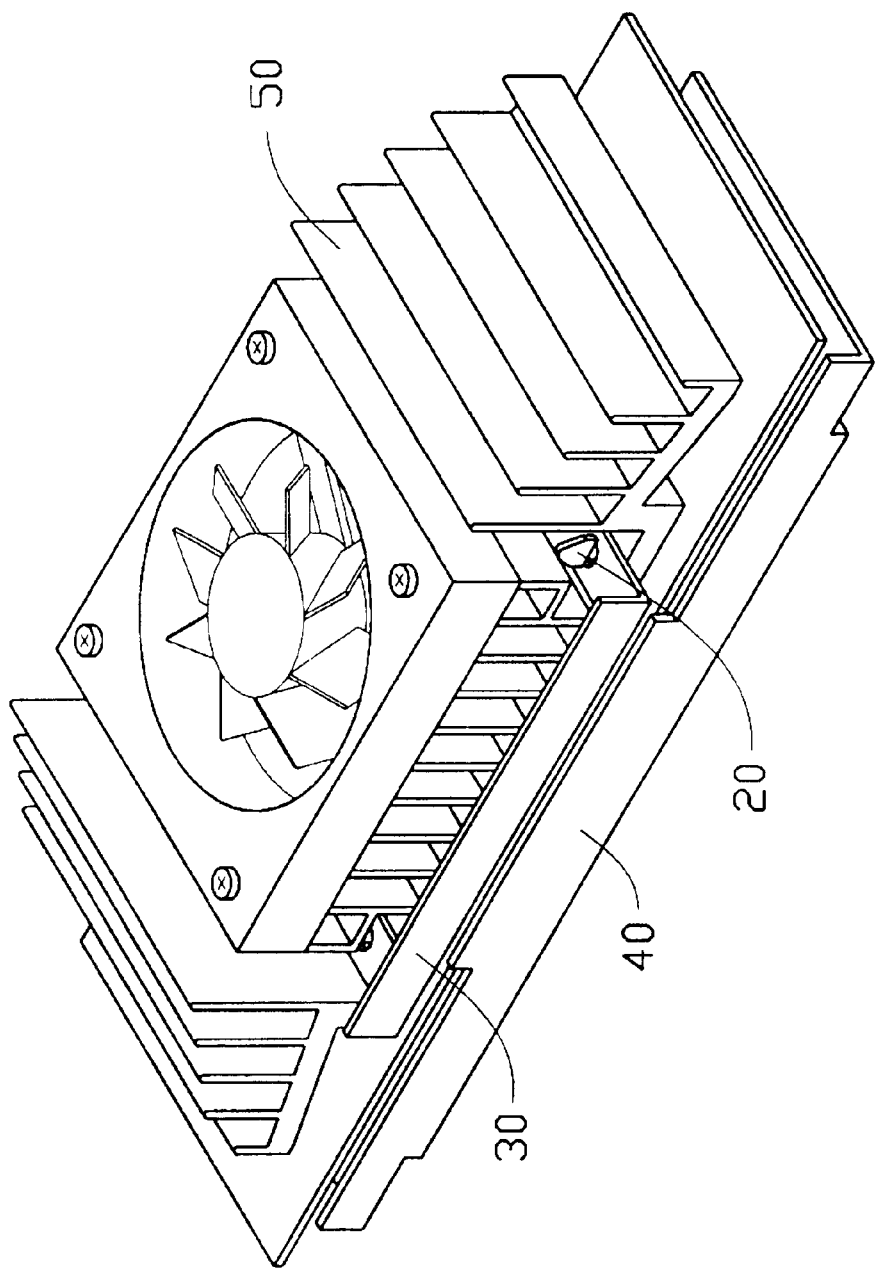
FIG. 4 is an assembled view of FIG. 3.

Referring to FIGS. 3 and 4, a retention mechanism in accordance with the present invention comprises a base plate 20 and a guiding member 30. The base plate 20 is attached to an outer surface 42 of a central processing unit (CPU) module 40, while the guiding member 30 is mounted to a heat sink 50.

The base plate 20 is H-shaped and comprises a main body 21 and two pairs of mounting legs 22 upwardly extending from corners (not labeled) of the main body 21. Four resilient abutting tabs 24 inwardly extend from the corners of the main body 21 for closely abutting against the outer surface 42 of the CPU module 40. Each mounting leg 22 forms a resilient locking tip 25 and a pair of cutouts 23 proximate the resilient tip 25. The CPU module 40 defines four apertures 41 for insertion of the corresponding mounting legs 22 of the base plate 20.

The guiding member 30 comprises a shaft 31 and a pair of latching arms 32 outwardly extending from opposite ends of the shaft 31. A pair of elongate engaging slots 33 is defined in each latching arm 32. A receiving aperture 35 is defined in communication with each engaging slot 33 for allowing the resilient tip 25 of the corresponding mounting leg 22 to extend therethrough. A pair of engaging tabs 34 is formed on opposite sides of each engaging slot 33 for engaging with the cutouts 23 of the corresponding mounting leg 22.

The heat sink 50 is mounted to a top surface 43 of the CPU module 40, and defines a pair of receiving grooves 51 corresponding to the latching arms 32 of the guiding member 30. Four receiving holes 52 are defined in a bottom wall 53 of the heat sink 50 in communication with the receiving grooves 51 for insertion of the mounting legs 22 of the base plate 20 therethrough.

In assembly, the mounting legs 22 are inserted through the corresponding apertures 41 of the CPU module 40 and the receiving holes 52 of the heat sink 50. The guiding member 30 is then disposed in the receiving grooves 51 of the heat sink 50. The latching arms 32 are received in the corresponding receiving grooves 51, while the shaft 31 is distanced from the heat sink 50. The resilient tips 25 of the mounting legs 22 are firstly received in the corresponding receiving apertures 35 of the latching arms 32. The guiding member is then driven to move in a direction "A". The tips 25 simultaneously slide along the elongate engaging slots 33 until the cutouts 23 engage with the corresponding engaging tabs 34. The shaft 31 of the guiding member 30 abuts against a lateral surface of the heat sink 50. Thus, the retention mechanism securely engages the CPU module 40 with the heat sink 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retention mechanism arrangement, comprising:
a central processing unit (CPU) module defining two pairs of apertures therein;
a heat sink being mounted to the CPU module, and defining a pair of receiving grooves and a pair of receiving holes in each receiving groove;
a base plate comprising a main body attached to the CPU module, and two pairs of mounting legs outwardly extending from the main body into corresponding apertures of the CPU module and into corresponding receiving holes of the heat sink; and
a guiding member including a shaft and a pair of latching arms extending from opposite ends of the shaft for being positioned in corresponding receiving grooves of the heat sink, a pair of elongate engaging slots being defined in each latching arm of the guiding member corresponding to the receiving holes of the heat sink for insertion of corresponding mounting legs of the base plate therethrough and for engaging with the mounting legs.

2. The retention mechanism as claimed in claim 1, wherein a resilient tip is formed on a free end of each mounting leg for being inserted through corresponding aperture of the CPU module, corresponding receiving hole of the heat sink, and corresponding receiving aperture of the guiding member.

3. The retention mechanism as claimed in claim 1, wherein a pair of engaging tabs is formed on opposite sides of each engaging slot for engaging with the cutouts of the mounting leg.

4. The retention mechanism as claimed in claim 1, wherein a pair of cutouts is defined in opposite sides of each mounting leg; and wherein a pair of engaging tabs is formed on opposite sides of each engaging slot and opposite corresponding receiving aperture of the guiding member for engaging with the cutouts of corresponding mounting leg.

5. The retention mechanism as claimed in claim 1, wherein a resilient abutting tab upwardly extends at an incline from the main body of the base plate for abutting against an outer surface of the CPU module.

6. The retention mechanism as claimed in claim 1, wherein the shaft of the guiding member abuts against an outer surface of the heat sink when the mounting legs of the base plate engage with corresponding engaging slots of the guiding member.

7. The retention mechanism as claimed in claim 1, wherein the mounting legs upwardly extend from corners of the main body for engaging with corresponding latching arms.

8. The retention mechanism as claimed in claim 1, wherein a receiving aperture is defined in communication with each engaging slot of the guiding member and aligned with corresponding receiving hole of the heat sink for extension of corresponding mounting leg therethrough.

9. A retention mechanism for attaching a heat sink, defining receiving holes and receiving grooves therein, to a chip modular member mounted on a printed circuit board and defining a pair of apertures therein, comprising:
a first member including a main body attached to the chip modular member, and two pairs of mounting legs outwardly extending from the main body into corresponding apertures of the chip modular member and into corresponding receiving holes of the heat sink; and
a second member including a shaft and a pair of latching arms extending from opposite ends of shaft for being positioned in corresponding receiving grooves of the heat sink, a pair of elongate engaging slots being defined in each latching arm of the second member corresponding to the receiving holes of the heat sink for insertion of corresponding mounting legs of the first member therethrough and for engaging with the mounting legs.

10. A retention arrangement comprising:
a central processing unit (CPU) module with at least one aperture therein;
a heat sink mounted to said CPU module with at least one receiving hole in alignment with said hole;

retention mechanism including a base and a guiding member, said base defining a resilient abutting portion abutting against the CPU module, and at least one mounting leg extending through the aperture and the hole with a locking tip extending to an exterior; and the guiding member defining at least one latching arm positioned on the heat sink; wherein said locking tip freely extends to the exterior from the hole when said guiding member is in a first position without engagement between the locking tip and the guiding member, while is latchably engaged by the latching arm when the guiding member transversely moves relative to the heat sink to a second position, thus resulting in said CPU module and said heat sink being tightly sandwiched between said guiding member and base of the retention mechanism.

11. The retention arrangement as claimed in claim 10, wherein said latching arm defines an elongate engaging slot in communication with a relatively large receiving aperture aside, a width of said slot being smaller than a transverse dimension of said locking tip while a diameter of said receiving aperture being larger than the transverse dimension of said locking tip.

* * * * *